July 7, 1942. H. P. KOPF 2,289,128
THERMOSTATIC CONTROL DEVICE
Filed June 16, 1941
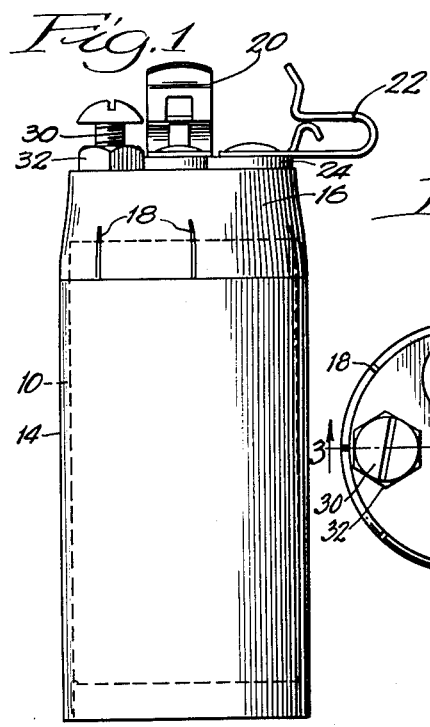
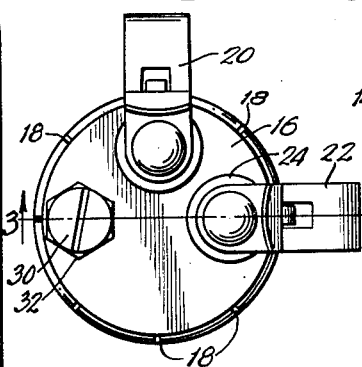
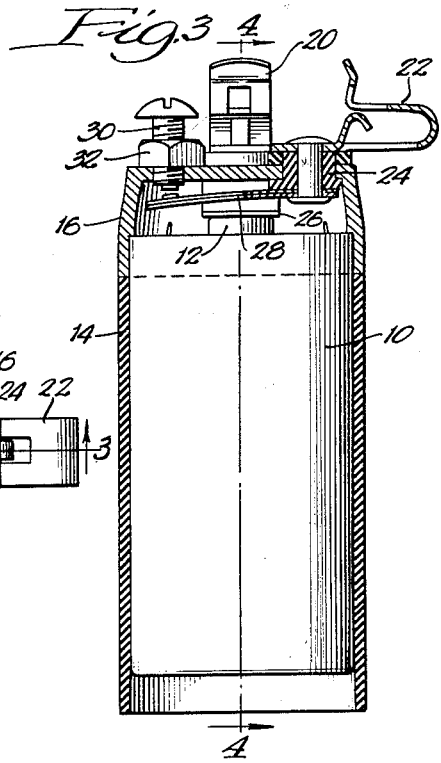
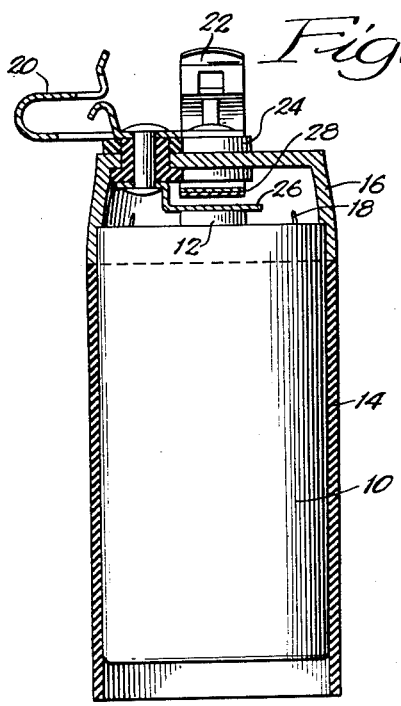
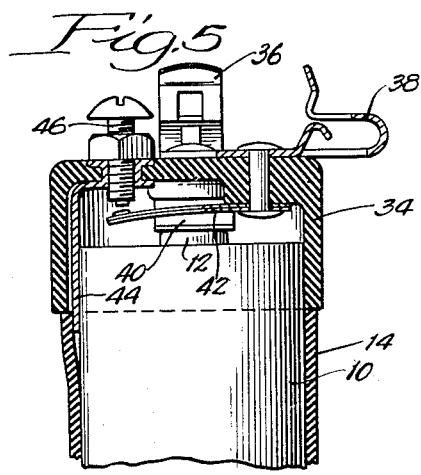
Inventor:
Howard P. Kopf,
By Dawson, Coons and Booth
Attorneys.

Patented July 7, 1942

2,289,128

UNITED STATES PATENT OFFICE 2,289,128

THERMOSTATIC CONTROL DEVICE

Howard P. Kopf, Chicago, Ill.

Application June 16, 1941, Serial No. 398,210

4 Claims. (Cl. 200—138)

This invention relates to thermostatic control devices and more particularly to relatively simple devices for use in conjunction with battery control circuits to effect a control of a circuit in accordance with temperature variations.

One of the objects of the invention is to provide an extremely simple and inexpensive device for controlling an electric circuit in accordance with variations in temperature.

Another object of the invention is to provide a thermostatic control device for use in conjunction with a standard electric cell to control a circuit from the cell in accordance with variations in temperature. According to one feature of the invention, the control device may be attached directly to the cell to form a completely portable unit.

The above and other objects and features of the invention will be apparent from the following description of the embodiments shown in the accompanying drawing, in which:

Figure 1 is a side elevation of a control device embodying the invention;

Figure 2 is a top plan view of the device;

Figure 3 is a side view with parts in section.

Figure 4 is a sectional view similar to Figure 3 on the line 4—4 of Figure 3; and Figure 5 is a partial view similar to Figure 3 of an alternative construction.

The illustrated device is adapted for use in combination with a standard electric cell of the type ordinarily employed in flashlight batteries and which includes a body portion 10 whose outer cover is formed of conducting material and provides one terminal of the cell with a second terminal 12 at the central portion of one end. Such cells are usually provided with a tubular cover 14 of paper or the like, and this cover may be slipped away from the end carrying the terminal 12, as shown, to expose a portion of the outer cover.

The control device of the present invention is adapted to be fitted on to the exposed end of the cell and, as shown, comprises a cap 16 adapted to form a slip fit on the exposed end of the cell. If desired, the skirt portion of the cap may be slit as indicated at 18, to provide spring fingers for gripping the periphery of the cell.

The cap carries a pair of terminals 20 and 22 adapted for connection to a circuit to be controlled. The terminals are insulated from the cap by means of insulating bushings 24 extending through the top of the cap and the terminal 20 carries a contact 26 adapted to engage the battery terminal 12 when the cap is assembled on the battery. The terminal 22 carries within the cap a bi-metal strip 28 connected to the terminal and having its free end underlying a screw 30 held in adjusted position on the cap by a lock nut 32 and forming an adjustable contact for engaging the free end of the bi-metal strip.

In use, the terminals 20 and 22 are connected in a circuit to be controlled and the adjustable contact 30 is set to be engaged by the strip 28 at the desired predetermined temperature. When the strip 28 is brought to the predetermined temperature, it will engage the contact 30 and complete a circuit from the outer cover of the cell through the cap 16, which is formed of metal or other conducting material, through the contact 30 and strip 28 to the terminal 22.

It will be understood that the strip 28 may be set to close upon either an increase or a decrease in temperature, depending upon the circuit which is to be controlled. For example, it is contemplated that the device may be utilized to control a fire alarm or sprinkler system circuit, in which case the strip 28 would be set to move upwardly upon an increase in temperature so as to close the circuit through the battery when a predetermined high temperature is reached, thereby to actuate a fire alarm, a sprinkler system or the like. An example of an environment in which the thermostat would be set to close the circuit on a falling temperature is the fire smudge pots in an orchard. For this use, the thermostat would be adjusted to move upwardly on a falling temperature so as to close the circuit when a predetermined low temperature is reached, thereby to energize devices for starting the smudge pots.

An alternative construction is illustrated in Figure 5, in which the cover is formed of non-conducting material such, for example, as a plastic composition. In this construction, the cap 34 is molded from a suitable plastic and has the terminals 36 and 38 riveted or otherwise connected directly thereto. The terminal 36 carries a contact 40 for engagement with the battery terminal 12, and a bi-metal strip 42 is connected to the rivet holding the terminal 38 on the cap. The second contact for engaging the outer cover of the cell is formed by a metal strip 44 molded or otherwise fastened into the cover and providing a threaded opening to receive an adjustable contact bolt 46. The operation of this construction is identical with that described above.

While two embodiments of the invention have been shown and described in detail, it will be understood that they are illustrative only and are not to be taken as a definition of the scope of the invention, reference being had for this purpose to the appended claims.

I claim:

1. A thermostatic control device for use with an electric cell comprising a cap having a skirt portion formed to fit over one end of the cell, terminals carried by said cap for connection to a circuit to be controlled, a contact member in the cap formed to engage one terminal of the cell and connected to one of said terminals on the cap, a second contact member in the cap formed to engage the other terminal of the cell, and thermostatic means in the cap adapted to connect the second contact member with the other terminal on the cap at a predetermined temperature.

2. A thermostatic control device for use with an electric cell comprising a cap having a skirt portion formed to fit over one end of the cell, terminals carried by said cap for connection to a circuit to be controlled, a contact member in the cap formed to engage one terminal of the cell and connected to one of said terminals on the cap, a second contact member in the cap formed to engage the other terminal of the cell, an adjustable contact on the cap connected to the other terminal on the cap, and a bi-metal strip in the cap connected at one end to said second contact member and adapted to engage the adjustable contact at its other end at a predetermined temperature.

3. A thermostatic control device for use with an electric cell of the type having a conducting cover forming one of its terminals and a second terminal at one end comprising a cap formed to fit over said one end of the cell, terminals carried by said cap for connection in a circuit to be controlled, a contact member in the cap connected to one of the terminals thereon and formed for engagement with one of the terminals of the cell, a second contact member in the cap formed for engagement with the other terminal of the cell, and thermostatic means in the cap to connect said second contact member to the other terminal carried by the cap at a predetermined temperature, one of said contact members comprising a conducting strip in the cap engaging the cover of the cell.

4. A thermostatic control device for use with an electric cell of the type having a conducting cover forming one of its terminals and a second terminal at one end comprising a cap formed to fit over said one end of the cell, terminals carried by said cap for connection in a circuit to be controlled, a contact member in the cap connected to one of the terminals thereon and formed for engagement with one of the terminals of the cell, said cap being formed of conducting material and engaging the cover of the cell to establish contact therewith, the other terminal on the cap being insulated therefrom, and thermostatic means in the cap to connect said other terminal thereto.

HOWARD P. KOPF.